United States Patent [19]

Inoue et al.

[11] Patent Number: 5,050,118

[45] Date of Patent: Sep. 17, 1991

[54] PLC DEVICE HAVING COMBINED HARDWARE AND SOFTWARE INPUT FILTERING

[75] Inventors: Michiya Inoue, Hachioji; Takashi Yamauchi, Minamitsuru, both of Japan

[73] Assignee: Fanuc Ltd., Minamitsuru, Japan

[21] Appl. No.: 626,314

[22] PCT Filed: Jun. 9, 1988

[86] PCT No.: PCT/JP88/00561

§ 371 Date: Jan. 25, 1989

§ 102(e) Date: Jan. 25, 1989

[87] PCT Pub. No.: WO88/09963

PCT Pub. Date: Dec. 15, 1988

Related U.S. Application Data

[63] Continuation of Ser. No. 305,868, filed as PCT JP88/00561 on Jun. 9, 1988, published as WO88/09963 on Dec. 15, 1988, abandoned.

[30] Foreign Application Priority Data

Jun. 12, 1987 [JP] Japan .................. 62-146701

[51] Int. Cl.$^5$ .............................. G06F 15/31
[52] U.S. Cl. .................................. 364/724.01
[58] Field of Search ............ 364/724.01; 375/26, 375/34, 60; 358/167

[56] References Cited

U.S. PATENT DOCUMENTS 4,653,016 3/1987 Mueller ................. 364/724.17

FOREIGN PATENT DOCUMENTS 0105667 9/1983 European Pat. Off. .
61-118802 6/1986 Japan .

Primary Examiner—Gary V. Harkcom
Assistant Examiner—Tan V. Mai
Attorney, Agent, or Firm—Staas & Halsey

[57] ABSTRACT

A programmable logic controller (PLC) device for effecting arithmetic operations of a sequential program by a microprocessor (1). The PLC device comprises a periodic signal generating circuit (2) for generating an interruption signal at a predetermined time interval, an input circuit (7) for receiving an external input signal, and circuits for effecting filter processing by reading a signal output by the input circuit at a predetermined time interval in response to the interruption signal. Since the filtering processing is effected by the microprocessor, a time constant of a filter can be changed by a program and can be also changed for each signal.

1 Claim, 3 Drawing Sheets

PLC DEVICE HAVING COMBINED HARDWARE AND SOFTWARE INPUT FILTERING

This application is a continuation of application number 07/305,868, filed as PCT JP88/00561 on Jun. 9, 1988, published as WO88/09963 on Dec. 15, 1988, now abandoned.

TECHNICAL FIELD

The present invention relates to a PLC device for effecting arithmetic operations of a sequential program, and more specifically to a PLC device for filtering an input signal of a microprocessor.

BACKGROUND ART

An input circuit of a PLC device is provided with a filter for removing noise and preventing malfunctions due to chatter or the like. The input circuit is provided with hardware filters For example, a circuit arrangement comprising a low pass filter of an integration circuit composed of a resistor a capacitor is generally used and an output thereof is shaped by a Schmitt circuit.

Nevertheless, since a filtering function effected by the conventional hardware filters requires a hardware filter circuit for each signal, the number of parts is increased, the cost of mounting becomes higher, and a larger space must be provided for mounting these parts. Further, the respective circuit elements must be changed to change a time constant of a filter, which is practically impossible after the device has been assembled. This is inconvenient when the PLC devices are installed in various locations where a high level of noise occurs. In addition, a filter having a large time constant must be provided when an input signal has a low speed and a filter having a small time constant must be provided when an input signal has a high speed, but the need to mount filters having a different time constant for each signal on the same printed circuit board or the like complicates the manufacture of a filter hardware.

SUMMARY OF THE INVENTION

An object of the present invention is to solve the above problems and to provide a PLC device for filtering of an input signal of a microprocessor without using a hardware filter.

To achieve the above object, in accordance with the present invention, there is provided as shown in FIG. 1, a PLC device for effecting arithmetic operations of a sequence program by a microprocessor (1): comprising a periodic signal generating circuit (2) for generating an interruption signal at a predetermined time interval; an input circuit (7) for receiving the external input signal; and filtering processing means for effecting a filtering process on a signal read from the input circuit at a predetermined time interval in response to the interruption signal.

The microprocessor reads a signal from an input circuit at a predetermined time interval, filters the signal and then takes in the as a signal to be processed. Accordingly, the hardware filter can be omitted and since the filtering processing is effected by the microprocessor, a time constant of a filter can be changed by a program, and can be also changed each time a signal is read.

DESCRIPTION OF THE PREFERRED EMBODIMENT

An embodiment of the present invention will be hereinafter described in detail with reference to the drawings.

Figure 1:
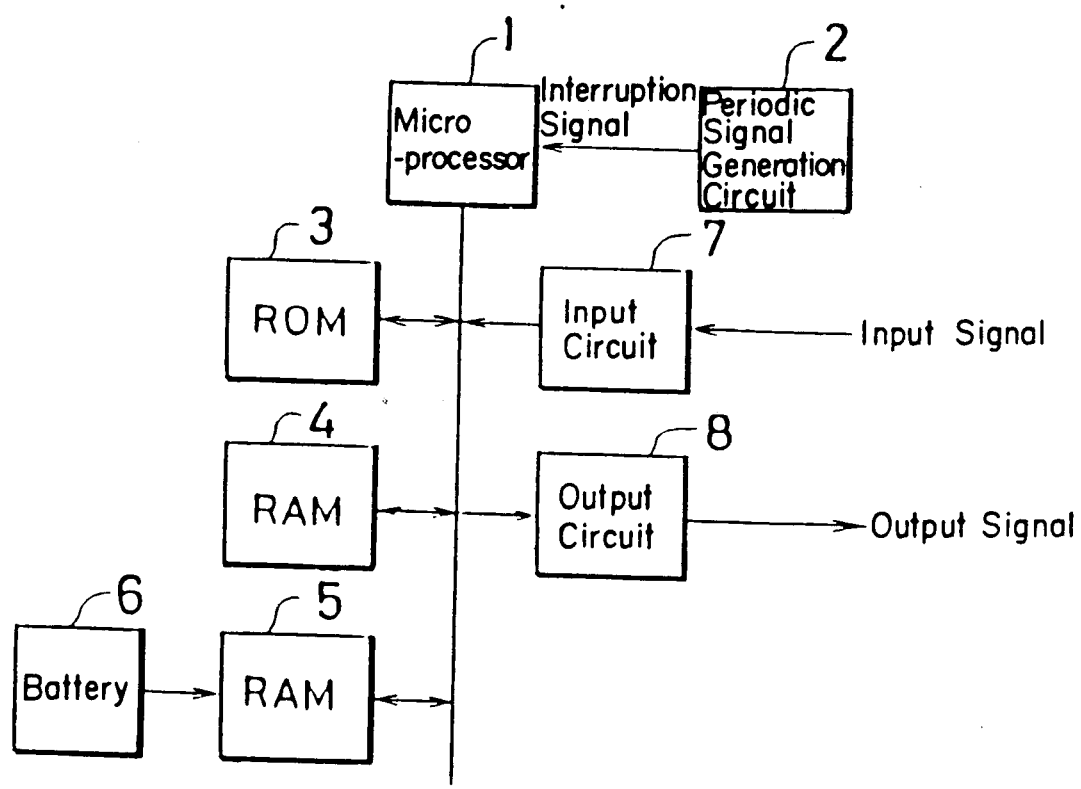
FIG. 1 is a block diagram of an embodiment of the present invention.

FIG. 1 is a block diagram of an embodiment of the present invention, wherein 1 designates a microprocessor effecting an overall control of a PLC device, and 2 designates a periodic signal generating circuit for generating an interruption signal at a processes filters of an input signal in response to the interruption signal and then takes in the signal for subsequent processing. Designated at 3 is a ROM for storing a system program, and the microprocessor 1 controls the PLC device in accordance with the system program of the ROM 3. Reference numeral 4 designates a RAM for a workpiece which stores various data or the like, and 5 designates a RAM for storing a sequential processing program. The sequential program is used for regulating a machine operation actually controlled by the PLC device, and can be changed in accordance with a change in the machine operation. The RAM 5 is also connected to a battery 6 to maintain the sequential processing program even if the power supply is accidentally turned off. Denoted at 7 is an input circuit having receiver circuits for receiving external input signals from the machine or the like and causing the microprocessor to read out the input signals through a bus. The respective receiver circuits of the input circuit 7 have either no filtering function or a filtering function having a small time constant, because the filtering process is effected by the microprocessor through software, as described later. Designated at 8 is an output circuit for outputting signals to operate the machine or the like.

With the PLC device as described above, the filtering function of the input circuit 7 is not effected by hardware. Namely, the microprocessor 1 effects filtering by taking in a signal from the input circuit 7 in response to an interruption signal from the periodic signal generating circuit 2, and as a result, a time constant or the like of the filter can be changed by merely changing the system program of the ROM 3. Further, the time constants of the filter can be easily changed because they are stored in the sequential program stored in the RAM 5, in a form of a parameter or the like.

Figure 2:
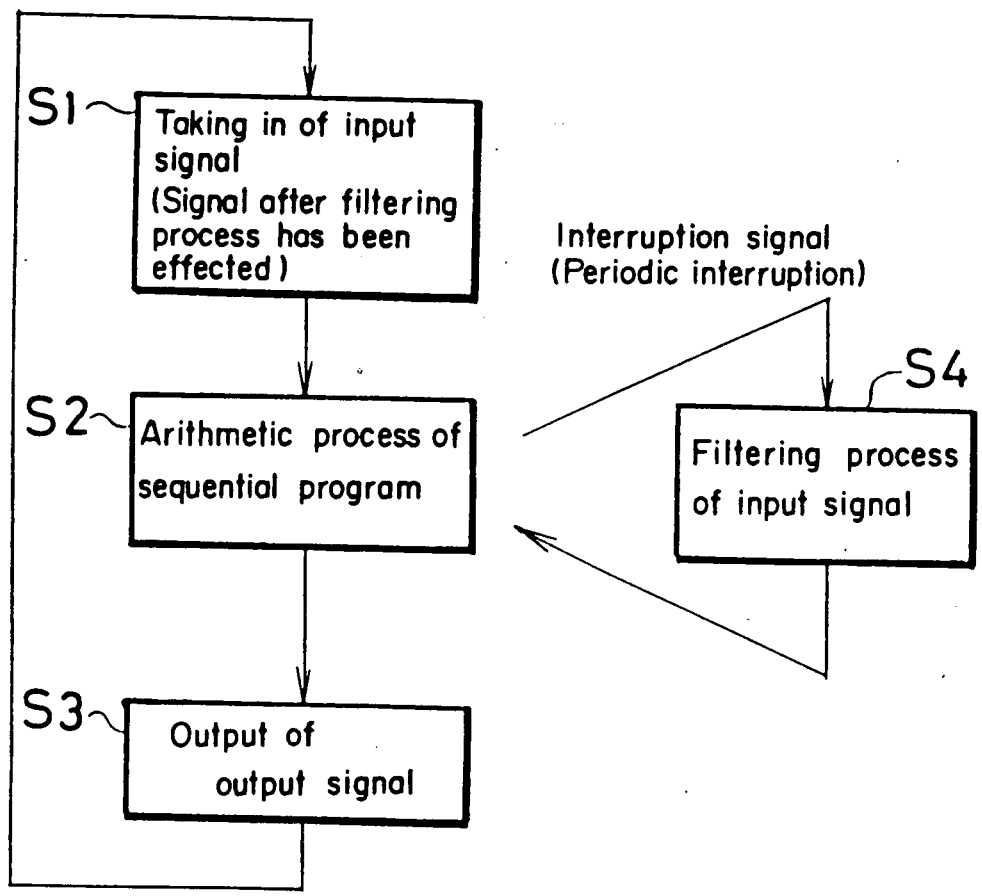
FIG. 2 is a flowchart of an embodiment of the present invention.

Next, the operation of the microprocessor 1 will be described with reference to FIG. 2 which is a flowchart of the embodiment. As shown in the drawing, the microprocessor 1 sequentially and periodically effects the processes S1, S2 and S3 as described below.

(S1) takes in an input signal. Note, the input signal has been filtered S4.

(S2) effects arithmetic operations of the sequence program: Here it effects a sequential program for controlling the machine.

(S3) produces an output signal as a result of the sequential processing of the program and which signal controls the actual operation of the machine.

The processing flow then goes to the process S4 in response to an interruption signal from the periodic signal generating circuit 2 while the program for the process S2 is effected.

Figure 3:
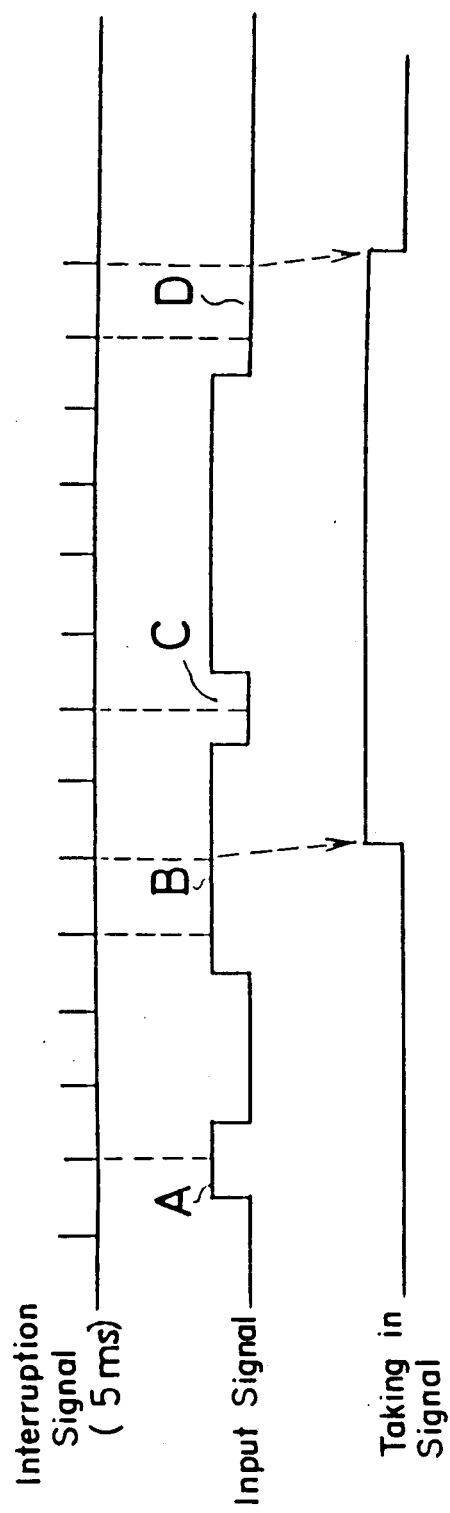
FIG. 3 is a time chart of a filtering process.

Next, an example of a filtering process will be described with reference to FIG. 3, which is a time chart for the filtering process. In the drawing, the interruption signal is a signal output by the periodic signal generating circuit 2 to the microprocessor 1 in FIG. 1; the input signal is a signal read from the input circuit 7 by the microprocessor 1 in FIG. 1; and the taken-in signal is a signal used by the microprocessor 1 as an internal signal after being filtered by the microprocessor 1.

In the filtering process, when an input signal remains in the same state after two interruption signals have been produced (interruption signals for two clocks), the input signal is processed as a taken-in signal. For example, when the input signal at position A is high for only one clock, the taken-in signal is not changed but when the input signal at position B is high for two clocks, the taken-in signal is made to high. On the contrary, although the input signal at a position C is made low, the taken-in signal is not changed but remains high because the input signal is low for only one clock. When the input signal at position D is low for two clocks, then the taken-in signal is made low. As described above, the filtering process prevents the appearance of the taken-in signal at the positions A and C of the input signal. Further, the number of clocks for which the input signal can be ignored as the taken-in signal can be changed by the system program, and can be also changed in accordance with the property of the respective signals. Furthermore, the number of clocks can be stored in the sequential program as a parameter and changed later.

According to the present invention, as described above, since the input circuit is not provided with hardware filter circuits and the filtering process is effected by the microprocessor through software, no filtering hardware parts are required. In addition, a time constant of the filter can be easily changed by the system program or the like with ease.

We claim:

1. A programmable logic control (PLC) device for effecting arithmetic operations, comprising:

periodic signal generating means for generating an interruption signal at a predetermined time interval;

input circuit means for receiving an external input signal, for filtering the external input signal based on a first time constant and for providing an output signal responsive to said filtering of the external input signal and;

filter processing means for reading, in response to the interruption signal, the output signal from the input circuit means at said predetermined time interval, for filtering, in response to the interruption signal, the read output signal, for providing, in response to the interruption signal, the filtered received output signal for use by the arithmetic operations based on a second time constant that is larger than the first time constant, and including means for executing the arithmetic operations based on a sequential program, and for filtering the output signal in response to receiving the interruption signal.

* * * * *